US012585275B1

(12) United States Patent
Towal et al.

(10) Patent No.: US 12,585,275 B1
(45) Date of Patent: Mar. 24, 2026

(54) LOSS SCALING FOR NEURAL NETWORKS

(71) Applicant: Nvidia Corporation, Santa Clara, CA (US)

(72) Inventors: Blythe Towal, San Diego, CA (US); Carolina Parada, Boulder, CO (US); Vijay Chintalapudi, Sunnyvale, CA (US); Maroof Mohammed Farooq, Boulder, CO (US)

(73) Assignee: NVIDIA Corporation, Santa Clara, CA (US)

( * ) Notice: Subject to any disclaimer, the term of this patent is extended or adjusted under 35 U.S.C. 154(b) by 13 days.

(21) Appl. No.: 16/378,188

(22) Filed: Apr. 8, 2019

Related U.S. Application Data

(60) Provisional application No. 62/684,328, filed on Jun. 13, 2018.

(51) Int. Cl.
  G05D 1/00 (2024.01)
  B60W 30/10 (2006.01)
  (Continued)

(52) U.S. Cl.
  CPC ........... G05D 1/0221 (2013.01); B60W 30/10 (2013.01); B60W 40/072 (2013.01);
  (Continued)

(58) Field of Classification Search
  CPC .............. G05D 1/0221; G05D 1/0088; B60W 2050/0022; B60W 2050/0025;
  (Continued)

(56) References Cited

U.S. PATENT DOCUMENTS

| | | | |
|---|---|---|---|
| 9,373,057 B1 | 6/2016 | Erhan et al. | |
| 10,157,331 B1 | 12/2018 | Tang et al. | |

(Continued)

FOREIGN PATENT DOCUMENTS

| | | | |
|---|---|---|---|
| EP | 1930863 A2 | 6/2008 | |
| EP | 1930868 A1 | 6/2008 | |

(Continued)

OTHER PUBLICATIONS

Tony Lacey, "Tutorial: The Kalman Filter", Jan. 12, 1998, Introduction (Year: 1998).*

(Continued)

*Primary Examiner* — Ig T An
(74) *Attorney, Agent, or Firm* — Davis Wright Tremaine LLP

(57) ABSTRACT

A navigation path can be determined for an object using one or more neural networks. In various embodiments, image data is obtained that is representative of an environment in which the object is to be navigated. Relevant features are identified from the image, and a curve fit to those features. Loss values for the potential paths are scaled based at least in part upon the distance of those features in the real world. This can include, in at least some embodiments, performing the scaling as a function of the curvature of the curve fit to the features. Temporal smoothing can be performed with respect to prior path predictions in order to prevent sudden changes in the predicted path. The paths are analyzed to select a path with a highest confidence value that also at least satisfies a minimum confidence criterion. The path can be converted into three-dimensional navigation information.

20 Claims, 10 Drawing Sheets

206

(51) Int. Cl.
    *B60W 40/072*        (2012.01)
    *G06N 3/045*         (2023.01)
    *G06N 3/048*         (2023.01)
    *G06N 5/04*          (2023.01)

(52) U.S. Cl.
    CPC ........... *G05D 1/0088* (2013.01); *G06N 3/045*
    (2023.01); *G06N 3/048* (2023.01); *G06N 5/04*
    (2013.01); *B60W 2552/20* (2020.02)

(58) Field of Classification Search
    CPC .. B60W 2552/20; B60W 40/072; G06N 3/02;
              G06N 20/00; G06N 5/04; G06T 7/136;
                              G06F 11/1476
    See application file for complete search history.

(56) References Cited

U.S. PATENT DOCUMENTS

| | | | |
|---|---|---|---|
| 10,768,621 | B1 * | 9/2020 | Nix ....................... G05D 1/0088 |
| 2004/0016870 | A1 | 1/2004 | Pawlicki et al. |
| 2004/0252864 | A1 | 12/2004 | Chang et al. |
| 2005/0196034 | A1 | 9/2005 | Hattori et al. |
| 2006/0178824 | A1 * | 8/2006 | Ibrahim .................. G01C 21/30 |
| | | | 701/446 |
| 2007/0154068 | A1 | 7/2007 | Stein et al. |
| 2008/0266396 | A1 | 10/2008 | Stein |
| 2009/0088941 | A1 | 4/2009 | Tsuchiya et al. |
| 2009/0256840 | A1 | 10/2009 | Varadhan et al. |
| 2010/0322476 | A1 | 12/2010 | Kanhere et al. |
| 2013/0106837 | A1 | 5/2013 | Mukherjee et al. |
| 2014/0104424 | A1 | 4/2014 | Zhang et al. |
| 2015/0054824 | A1 | 2/2015 | Jiang |
| 2015/0278578 | A1 | 10/2015 | Otsuka et al. |
| 2015/0346716 | A1 | 12/2015 | Scharfe et al. |
| 2016/0247290 | A1 | 8/2016 | Liu et al. |
| 2016/0321074 | A1 | 11/2016 | Hung et al. |
| 2017/0010613 | A1 * | 1/2017 | Fukumoto .......... G01C 21/3492 |
| 2017/0061632 | A1 | 3/2017 | Lindner et al. |
| 2017/0116781 | A1 | 4/2017 | Babahajiani et al. |
| 2017/0124717 | A1 | 5/2017 | Baruch et al. |
| 2017/0220876 | A1 | 8/2017 | Gao et al. |
| 2017/0344808 | A1 | 11/2017 | El-Khamy et al. |
| 2017/0371346 | A1 | 12/2017 | Mei et al. |
| 2018/0089833 | A1 | 3/2018 | Lewis et al. |
| 2018/0121273 | A1 | 5/2018 | Fortino et al. |
| 2018/0136332 | A1 | 5/2018 | Barfield, Jr. et al. |
| 2018/0158244 | A1 | 6/2018 | Ybanez Zepeda et al. |
| 2018/0188059 | A1 | 7/2018 | Wheeler et al. |
| 2018/0203959 | A1 | 7/2018 | Refsnaes et al. |
| 2018/0232663 | A1 | 8/2018 | Ross et al. |
| 2018/0267558 | A1 | 9/2018 | Tiwari et al. |
| 2018/0300590 | A1 | 10/2018 | Briggs et al. |
| 2018/0304468 | A1 | 10/2018 | Holz |
| 2018/0348374 | A1 | 12/2018 | Laddha et al. |
| 2018/0349746 | A1 | 12/2018 | Vallespi-Gonzalez |
| 2018/0370540 | A1 | 12/2018 | Yousuf et al. |
| 2018/0373980 | A1 | 12/2018 | Huval |
| 2019/0066328 | A1 | 2/2019 | Kwant et al. |
| 2019/0080266 | A1 * | 3/2019 | Zhu .................... G01C 21/3453 |
| 2019/0101399 | A1 | 4/2019 | Sunil Kumar et al. |
| 2019/0102646 | A1 | 4/2019 | Redmon et al. |
| 2019/0102668 | A1 | 4/2019 | Yao et al. |
| 2019/0129831 | A1 | 5/2019 | Goldberg |
| 2019/0147600 | A1 | 5/2019 | Karasev et al. |
| 2019/0147610 | A1 | 5/2019 | Frossard et al. |
| 2019/0171912 | A1 | 6/2019 | Vallespi-Gonzalez et al. |
| 2019/0179979 | A1 | 6/2019 | Melick |
| 2019/0272462 | A1 * | 9/2019 | Franzius ............... H04W 4/026 |
| 2019/0310644 | A1 * | 10/2019 | Zhang ................ G01C 21/3453 |
| 2020/0139959 | A1 * | 5/2020 | Akella ............... G01C 21/3446 |
| 2020/0143205 | A1 | 5/2020 | Yao et al. |
| 2020/0160559 | A1 | 5/2020 | Urtasun et al. |
| 2020/0175311 | A1 | 6/2020 | Xu et al. |
| 2020/0216076 | A1 * | 7/2020 | Otto ..................... G05D 1/0276 |
| 2020/0257301 | A1 * | 8/2020 | Weiser ..................... G06N 3/02 |
| 2020/0257306 | A1 | 8/2020 | Nisenzon |
| 2021/0025696 | A1 | 1/2021 | Goto et al. |
| 2021/0089794 | A1 | 3/2021 | Chen et al. |
| 2021/0286923 | A1 | 9/2021 | Kristensen et al. |

FOREIGN PATENT DOCUMENTS

| | | | |
|---|---|---|---|
| KR | 20120009590 A | 2/2012 | |
| WO | 2016183074 A1 | 11/2016 | |
| WO | 2018002910 A1 | 1/2018 | |
| WO | WO-2018083672 A1 * | 5/2018 | ........... G06F 18/217 |
| WO | WO-2018132607 A2 * | 7/2018 | ............ G08G 1/167 |

OTHER PUBLICATIONS

U.S. Appl. No. 62/631,781, "Methods for Accurate Real-time Object Detection and for Determining Confidence of Object Detection Suitable for Autonomous Vehicles," filed Feb. 18, 2018.

Notice of Allowance dated Jul. 16 , 2021 in U.S. Appl. No. 16/728,598 , 9 pages.

Notice of Allowance dated Jul . 2, 2021 in U.S. Appl. No. 16/813,306 , 13 pages.

Notice of Allowance dated Oct. 7, 2021 in U.S. Appl. No. 16/813,306, 9 pages.

Preinterview First Office Action dated Jan. 26, 2021 in U.S. Appl. No. 16/355,328 , 5 pages.

Q. Wang, J. Gao and Y. Yuan, Embedding Structured Contour and Location Prior in Siamesed Fully Convolutional Networks for Road Detection, in IEEE Transactions on Intelligent Transportation Systems, vol. 19, No. 1, pp. 230-241, Jan. 2018.

R. Benenson, R. Timofte, and L. Gool. Stixels estimation without depth map computation. In ICCV, 2011, 8 Pages.

Rahul Mohan , "Deep deconvolutional networks for scene parsing", CORR, abs/1411.4101, 2014.

Rothe, R. , Guillaumin, M., & Van Gool, L. (Nov. 2014). Non maximum suppression for object detection by passing messages between windows. In Asian conference on computer vision (pp. 290-306 ).

Stein , G. P. , Mano , O. , & Shashua , A. (Jun. 2003). Vision—based ACC with a single camera : bounds on range and range rate accuracy . In IEEE IV2003 Intelligent Vehicles Symposium. Proceedings (Cat. No. 03TH8683 ) (pp. 120-125 ) IEEE.

Suorsa, R. E. , & Sridhar , B. ( 1994 ) . A parallel implementation of a multisensor feature—based range—estimation method IEEE transactions on robotics and automation , 10 ( 6 ) , 755-768.

Szegedy et al., "Going Deeper with Convolutions," CVPR, 2015, 9 pages.

Tao et al., "Detectnet: Deep neural network for object detection in digits," Retrieved from, DetectNet: Deep Neural Network for Object Detection in Digits | Nvidia Technical Blog <https://developer.nvidia.com/blog/detectnet-deep-neural-network-object-detection-digits/>, Aug. 11, 2016, 13 Pages.

Tateno et al., "CNN-SLAM: Real-time Dense Monocular Slam with Learned Depth Prediction," CVPR, 2017, 10 pages.

Thrun et al., "Probabilistic Robotics," MIT Press, 2005, 492 pages.

U.S. Appl. No. 62/584,549, "Systems and Methods for Safe and Reliable Autonomous Vehicles," Nov. 10, 2017.

U.S. Appl. No. 62/614,466, "Systems and Method for Controlling Autonomous Vehicles," Jan. 17, 2018.

U.S. Appl. No. 62/625,351, "Systems and Method for Safe Operation of Autonomous Vehicles," Feb. 2, 2018.

U.S. Appl. No. 62/628,831, "Conservative Control for Zone Driving of Autonomous Vehicles," Feb. 9, 2018.

U.S. Appl. No. 62/629,822, "Systems and Methods for Sharing Camera Data Between Primary and Backup Controllers in Autonomous Vehicle Systems," Feb. 13, 2018.

U.S. Appl. No. 62/630,445, "Pruning Convolutional Neural Networks for Autonomous Vehicles and Robotics," Feb. 14, 2018.

U.S. Appl. No. 62/635,503, "Systems and Methods for Autonomous Shuttles, Robo-Taxis, Ride-Sharing and On-Demand Vehicles," Feb. 26, 2018.

(56) References Cited

OTHER PUBLICATIONS

U.S. Appl. No. 62/636,142, "Methids for Accurate Real-time Lane and Road Boundary Detection for Autonomous Driving," Feb. 27, 2018.

Virgo, "Lane Detection with Deep Learning (Part 1)," Retrieved from, <https://towardsdatascience.com/lane-detection-with-deep-learning-part-1-9e096f3320b7,> May 9, 2017, 16 Pages.

Weber, M., Wolf, P., & Zöllner, J. M. (Jun. 2016). DeepTLR: A single deep convolutional network for detection and classification of traffic lights. In 2016 IEEE Intelligent Vehicles Symposium (IV)(pp .342-348 ) . IEEE.

Webopedia, "What is a Polyline?," Retrieved from, <https://www.webopedia.com/definitions/polyline/,> May 25, 2022, 3 Pages.

Wikipedia, Euler Spiral, Retrieved from, https://en.wikipedia.org/wiki/Euler_spiral ., Feb. 21, 2019, 1 Page.

Wikipedia, "F1 score," Retrieved from, <https://en.wikipedia.org/wiki/F1_score_.,> Accessed Feb. 21, 2019, 1 Page.

A. Elfes . Sonar—based real—world mapping and navigation. Journal of Robotics and Automation, 1987.

Asvadi , A. , Garrote, L. , Premebida , C. , Peixoto , P., & Nunes, U. J. (Oct. 2017) . Depthon : vehicle detection using 3d—lidar and convnet. In 2017 IEEE 20th International Conference on Intelligent Transportation Systems (ITSC) ( pp. 1-6 ) .IEEE.

Bach, M. , Reuter, S., & Dietmayer, K. (Jun. 2017 ) . Multi-camera traffic light recognition using a classifying labeled multi-bernoulli filter. In 2017 IEEE Intelligent Vehicles Symposium (IV) (pp . 1045-1051 ).

Bidlack, C., Hampapur, A., Katkere, A., Feng, L., Kagalwala, F., Kraljevic, T., & Weymouth, T. ( May 1994 ) . Visual robot navigation using flat earth obstacle projection . In Proceedings of the 1994 IEEE International Conference on Robotics and Automation ( pp . 3374-3381 ) . IEEE.

C. C. T. Mendes V. Fremont D. F. Wolf . Exploiting fully convolutional neural networks for fast road detection , Proc . IEEE Int. Conf. Robot. Auto. ( ICRA ), pp. 3174-3179 May 2016.

Chilamkurthy et al., "A 2017 Guide to Semantic Segmentation with Deep Learning," Retrieved from, <https://blog.qure.ai/notes/semantic-segmentation-deep-learning-review,> Jul. 5, 2017, 16 Pages.

Clemens-Alexander Brust, Sven Sickert, Marcel Simon, Erik Rodner, and Joachim Denzler "Convolutional patch networks with spatial prior for road detection and urban scene understanding", In International Conference on Computer Vision Theory and Applications (VISAPP), 2015.

D. Levi N. Garnett E. Fetaya "Stixelnet: A deep convolutional network for obstacle detection and road segmentation", 26th British Machine Vision Conference ( BMVC ) 2015.

Data Science, What are deconvolutional layers? <https://datascience.stackexchange.com/questions/6107/what-are-deconvolutional-layers>, Retrieved from, <https://datascience.stackexchange.com/questions/6107/what-are-deconvolutional-layers, > Feb. 21, 2019, 18 Pages.

Deshpande, "A Beginner's Guide to Understanding Convolutional Neural Networks," Retrieved from, <https://adeshpande3.github.io/A-Beginner%27s-Guide-To-Understanding-Convolutional-Neural-Networks/,> Jul. 20, 2016, 25 Pages.

Dipietro, "A Friendly Introduction to Cross-Entropy Loss," Retrieved from, <https://rdipietro.github.io/friendly-intro-to-cross-entropy-loss/> , May 2, 2016, 10 Pages.

First Action Interview Office Action dated Mar. 1, 2021 in U.S. Appl. No. 16/355,328, 4 pages.

Gabriel L. Oliveira, Wolfram Burgard , Thomas Brox. Efficient Deep Models for Monocular Road Segmentation. IEEE / RSJ International Conference on Intelligent Robots and Systems ( IROS 2016).

Garnett, "Real-time Category-Based and General Obstacle Detection for Autonomous Driving," ICCV, 2017, 8 Pages.

H. Badino, U. Franke, and D. Pfeiffer. The stixel world—acompact medium level representation of the 3d—world . In DAGM, 2009.

H. Badino, U. Franke, and R. Mester. Free space computation using stochastic occupancy grids and dynamic programming . In ICCV Workshop on Dynamical Vision, 2007.

H. Hirschmuller. Stereo processing by semiglobal matching and mutual information. PAMI, 2008.

Han et al., "Learning Both Weights and Connections for Efficient Neural Networks," In Proceedings of the 28th International Conference on Neural Information Processing Systems—vol. 1, Oct. 30, 2015, pp. 1135-1143.

He et al., "Deep Residual Learning for Image Recognition," CVPR, 2016, 9 pages.

He et al., "Learning depth from single images with deep neural network embedding focal length," IEEE Transactions on Image Processing, 27 (9), 2018, 4676-4689.

Huval et al., "An Empirical Evaluation of Deep Learning on Highway Driving," Apr. 17, 2015, 7 Pages.

International Preliminary Report on Patentability received for PCT Application No. PCT / US2019 / 024400 , dated Oct. 8, 2020 , 10 pages.

International Preliminary Report on Patentability received for PCT Application No. PCT / US2019 / 068764 , dated Jul . 8, 2021 , 12 pages.

International Preliminary Report on Patentability received for PCT Application No. PCT / US2019 / 068766 , dated Jul . 8, 2021 , 10 pages.

International Preliminary Report on Patentability received for PCT Application No. PCT/US2019/018348, dated Aug. 27, 2020, 16 pages.

International Preliminary Report on Patentability received for PCT Application No. PCT/US2019/019656 , dated Sep. 3, 2020, 11 pages.

International Preliminary Report on Patentability received for PCT Application No. PCT/US2019/022592, dated Sep. 24, 2020, 11 pages.

International Search Report and Written Opinion dated Apr. 22, 2020 in International Application No. PCT / US2019 / 068766.

International Search Report and Written Opinion dated Aug. 26, 2019 in International Patent Application No. PCT / US2019 / 022592, 18 Pages.

International Search Report and Written Opinion dated Jul. 25, 2019 in International Patent Application No. PCT / US 2019/018348, 22 pages.

International Search Report and Written Opinion dated Jul. 24, 2019 in International Patent Application No. PCT / US2019 / 019656, 15 pages.

Ioffe et al., "Batch Normalization: Accelerating Deep Network Training by Reducing Internal Covariate Shift," Mar. 2, 2015, 11 Pages.

J. Franke and I. Kutzbach . Fast stereo based object detection for stop and go traffic . In IV , 1996.

J. Yao, S. Ramalingam, Y. Taguchi, Y. Miki, and R. Urtasun, "Estimating drivable collision—free space from monocular video," in Applications of Computer Vision, 2015, pp. 420-427.

Jayaraman , A. et al . , "Creating 3D Virtual Driving Environments for Simulation—Aided Development of Autonomous Driving and Active Safety", SAE Technical Paper Series , vol. 1 , pp. 1-3 ( Mar. 28, 2017 ) ( English Abstract Submitted ).

Jose M. Alvarez , Theo Gevers , Yann LeCun , and Antonio M. Lopez , "Road scene segmentation from a single image", In Proceedings of the 12th European Conference on Computer Vision—vol. Part VII , ECCV'12 , pp. 376-389, Berlin, Heidelberg, 2012.

Kim et al., "Depth map coding with distortion estimation of rendered view," InVisual Information Processing and Communication ( vol. 7543, p. 75430B ). International Society for Optics and Photonics, Jan. 2010, 10 Pages.

Kingma et al. "Adam: A Method for Stochastic Optimization," arXiv:1412.6980, dated Dec. 22, 2014, 9 pages.

Liu et al., "Neural Person Search Machines," IEEE, 2017, 9 Pages.

Long, "Fully Convolutional Networks for Semantic Segmentation," CVPR, 2015, 10 pages.

(56)         References Cited

OTHER PUBLICATIONS

Marvin Teichmann , Michael Weber , Marius Zoellner , Roberto Cipolla, and Raquel Urtasun. Multinet: Real-time joint semantic reasoning for autonomous driving. arXiv preprint arXiv: 1612. 07695, 2016.

Mathworks, "Polynomial Curve Fitting," Retrieved from, <https:// www.mathworks.com/help/matlab/ref/polyfit.html,> Feb. 21, 2019, 13 Pages.

Molchanov et al., Pruning Convolutional Neural Networks for Resource Efficient Inference, ICLR, 2017, 12 pages.

Neven et al., "Towards End-to-End Lane Detection: an Instance Segmentation Approach," Feb. 15, 2018, 7 Pages.

Non- Final Office Action dated Oct. 21, 2020 in U.S. Appl. No. 16/277,895 , 13 pages.

Non Final Office Action dated Oct. 7, 2021 in U.S. Appl. No. 16/366,875 , 22 pages.

Non-Final Office action dated Jun. 2, 2020 in U.S. Appl. No. 16/286,329.

Non-Final Office Action dated May 13, 2021 in U.S. Appl. No. 16/728,595, 18 pages.

Notice of Allowance dated Aug. 31, 2021 in U.S. Appl. No. 16/728,595 , 8 pages.

Notice of Allowance dated Jan. 19, 2021 in U.S. Appl. No. 16/286,329 , 8 pages.

\* cited by examiner

602 — Receive image data including path region

604 — Determine relevant features from image data

606 — Perform curve fitting using relevant features

608 — Determine loss values for curves

610 — Apply scaling to the weight parameters of a loss function

612 — Provide the determined path data

900

Input Layer 902

Output Layer 906

Validation

Loss
Function
908

Inference
Scores

Intermediate Layers 904
(weights of network)

1000

1002

LOSS SCALING FOR NEURAL NETWORKS

CROSS-REFERENCE TO RELATED APPLICATIONS

This application claims priority to U.S. Provisional Patent Application Ser. No. 62/684,328, filed Jun. 13, 2018, entitled "Deep Learning for Path Detection in Autonomous Vehicles," which is hereby incorporated herein by reference in its entirety for all purposes.

BACKGROUND

As machine learning and artificial intelligence become increasingly utilized across a variety of industries, the variety and complexity of the various approaches utilized increase accordingly. In many instances a neural network will accept image data as input and attempt to infer information about objects represented in the image data. For relatively well-defined objects, such as dogs or cats, a neural network can be trained to recognize those types of objects in image data. The losses used for the inference are often based at least in part upon a bounding box or other boundary that can be weighted by the number of pixels in the image that are within that boundary. The loss can be adjusted based in part upon the type of object inferred in the bounding box as well, to attempt to balance the effect of having different numbers of samples for different classifications of objects. It may be the case, however, that an object is not well-defined. For example, a road or path in front of a vehicle may have any arbitrary length and shape, with points in the distance being more difficult to learn. Conventional approaches to determining the loss for such objects based on the type of object do not yield sufficiently adequate results.

BRIEF DESCRIPTION OF THE DRAWINGS

Various embodiments in accordance with the present disclosure will be described with reference to the drawings, in which.

DETAILED DESCRIPTION

Figure 1A:
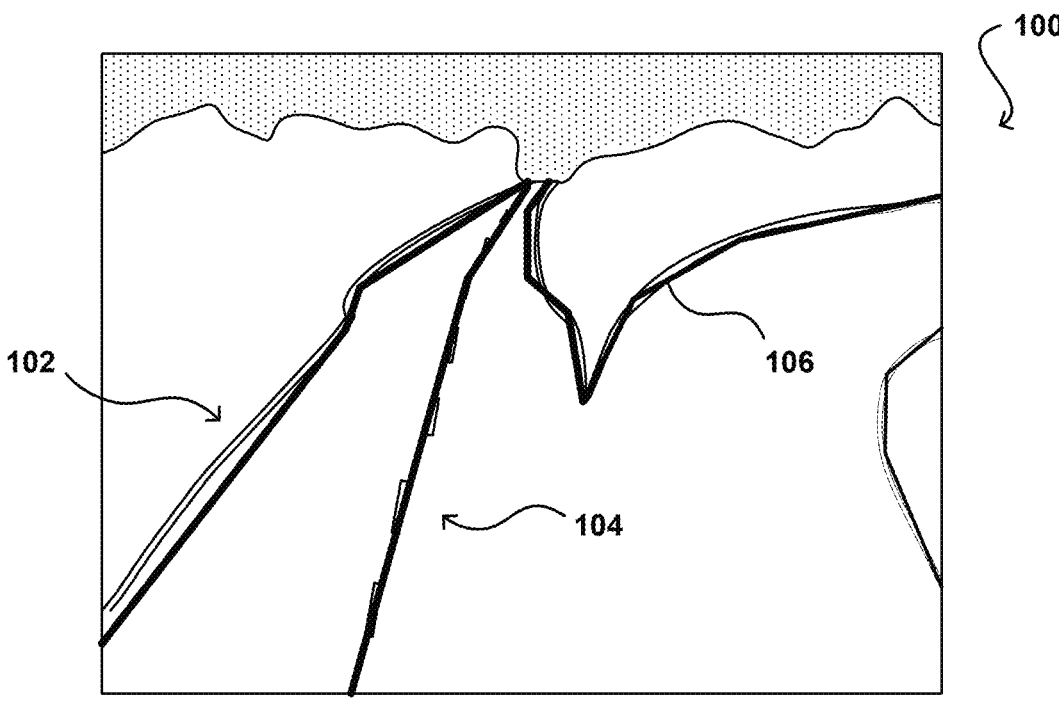
FIGS. 1A and 1B illustrate lanes and paths that can be determined for an image captured by a camera of a vehicle in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the training and utilization of machine learning and artificial intelligence. In particular, various embodiments provide for the prediction of paths for a controllable object, such as a vehicle or robot, using features determined from the environment. In various embodiments, image (or video) data can be captured that includes a visual representation of an environment in which the object is to be navigated. The image data can be analyzed to identify relevant features in the image, such as lane markers or path boundaries. This information can be provided as input to a path determination module, for example, which can include one or more neural networks. A neural network can determine one or more potential paths. In some embodiments, this can involve fitting a curve, or other non-linear function, to at least some of the identified features. The loss values for the path can be scaled based at least in part upon the distance of those features in the real world. This can include, in at least some embodiments, performing the scaling as a function of the curvature of the curve or function fit to the features, where the scaling also takes into account the distances to the points along that curve or function. Temporal smoothing can be performed with respect to prior path predictions in order to prevent sudden changes in the predicted path. The paths can then be analyzed to select a path with a highest confidence value that also at least satisfies a minimum confidence criterion. The path can then be converted into three-dimensional information, which can be provided to a control or navigation system of the object to be navigated.

Various other functions can be implemented within the various embodiments as well as discussed and suggested elsewhere herein.

Approaches in accordance with various embodiments can provide for accurate loss weighting, particularly for datasets with geometrical imbalances. For example, there may be a set of training data for navigable roads that have many examples of straight roads, but very few examples of roads having a specific curvature. This imbalance can cause inferences based on roads with specific curvature to be potentially inaccurate due to the training bias towards straight roads resulting from the imbalance of the training dataset. In one embodiment, the curvature of every road, or road edge, in a dataset is measured. Curvature and other geometrical properties are, by nature, continuous properties and not discrete properties. In order to measure the frequency of each curvature, the data can be artificially binned, or histogrammed, in order to determine the distribution of curvatures in the dataset. To prevent this binning from introducing artificial discontinuities in the loss weighting, a curve can be fit to the histogram of the curvatures (or other geometrical property) in at least some embodiments. The inverse of this function can then define an equation that can be used to calculate the loss weighting to be applied. During training time, the curvature (or other geometrical property) of each training sample can be measured, or otherwise obtained, and the loss value calculated from that value and the weighting equation. Other geometrical properties can also be measured and corrected for as well within the scope of the various embodiments. Examples include the resolution of points in the image, the length or size of label areas, the three-dimensional distance of labels in an image, or the location of labels in an image, among other such options.

As mentioned, conventional approaches used for bounding boxes and other such boundaries used to recognize various types of objects in image data do not provide adequate results for all object types. Accordingly, approaches in accordance with various embodiments can attempt to adjust the loss for an object based, at least in part, upon the features observed for that object. For a road or path, this may include features such as edge lines, lane lines, path markers, and the like. As mentioned, however, not all of these features should be treated the same, as there can be much more uncertainty in the position of features in the image that are much further away in physical distance. This uncertainty also makes it more difficult to train a neural network to properly classify or generate inferences based on that data.

As an example, FIG. 1A illustrates an example image 100 that can be captured by a camera of a vehicle driving on a public road in accordance with various embodiments. The points towards the bottom of the image are closer to the camera, and thus can be determined with more accuracy, than are points closer to the top of the image, which represent features that are further away. A lane detection algorithm might look at these features and identify the edges 102, 104, 106 of the various lanes, as illustrated. As illustrated, the lane markers provide some level of guidance, but do not indicate the appropriate locations for a vehicle based on the markers alone. Further, as the points get further in the distance the uncertainty becomes greater. Thus, trying to determine a path based on the pixel locations of the boundaries can be insufficient.

Figure 1B:
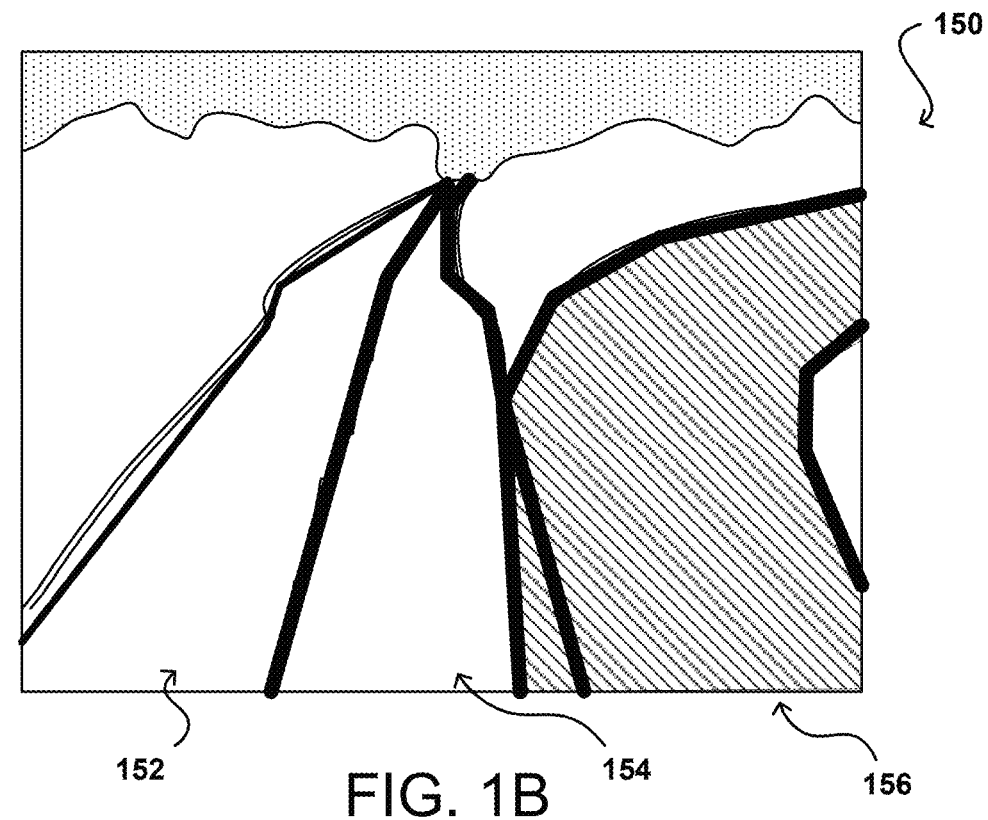

Approaches in accordance with various embodiments can attempt to utilize the lane markers, and/or determine lane edges 102, 104, 106 to determine potential paths 152, 154, 156 for a vehicle to follow, as illustrated in the example image 150 of FIG. 1B. In this example, curves or functions are fit to the respective features to attempt to determine relatively continuous curves or representations that are relatively accurate for the potential paths. As illustrated, the defined paths then present a set of options for the vehicle, rather than just boundaries as illustrated in FIG. 1A.

The path approach of FIG. 1B will still, however, suffer some of the same uncertainty issues. The points in the distance will have more uncertainty than nearby points. This can result in a curve fit to those points being inaccurate for at least a portion of a respective path. It can be desirable to adjust the weighting of those points in order to change the amount of impact they have on the fitting process. For example, applying lower weighting to the points in the distance can cause the curve fitting to be more accurate for the near distance, which may be more important for vehicles operating on a highway, where the most important decisions will often be made in the next few seconds. In other situations, however, it may be desired to weight the points in the distance more heavily because the amount of physical distance associated with an image pixel will be much greater for points in the distance, such that any inaccuracies in the fitting can have much larger position inaccuracies in the real world.

Approaches in accordance with various embodiments can therefore take advantage of a scaling function, or weighting function, that can adjust the loss values, or weights, for various points along an inferred path. The scaling can cause the weighting to increase or decrease with distance according to a determined function. For path planning where curve fitting is used to determine the relevant path(s), the scaling can be a function of the curvature of the respective paths. In this way, the loss is determine based not on the type (or class) of object being detected, as in conventional approaches, but instead upon geometric properties (such as curvature) determined from the image data. The use of geometric properties can help to account for other variations as well, as may be correspond to distortion effects from a camera lens or other such factors.

Figure 2:
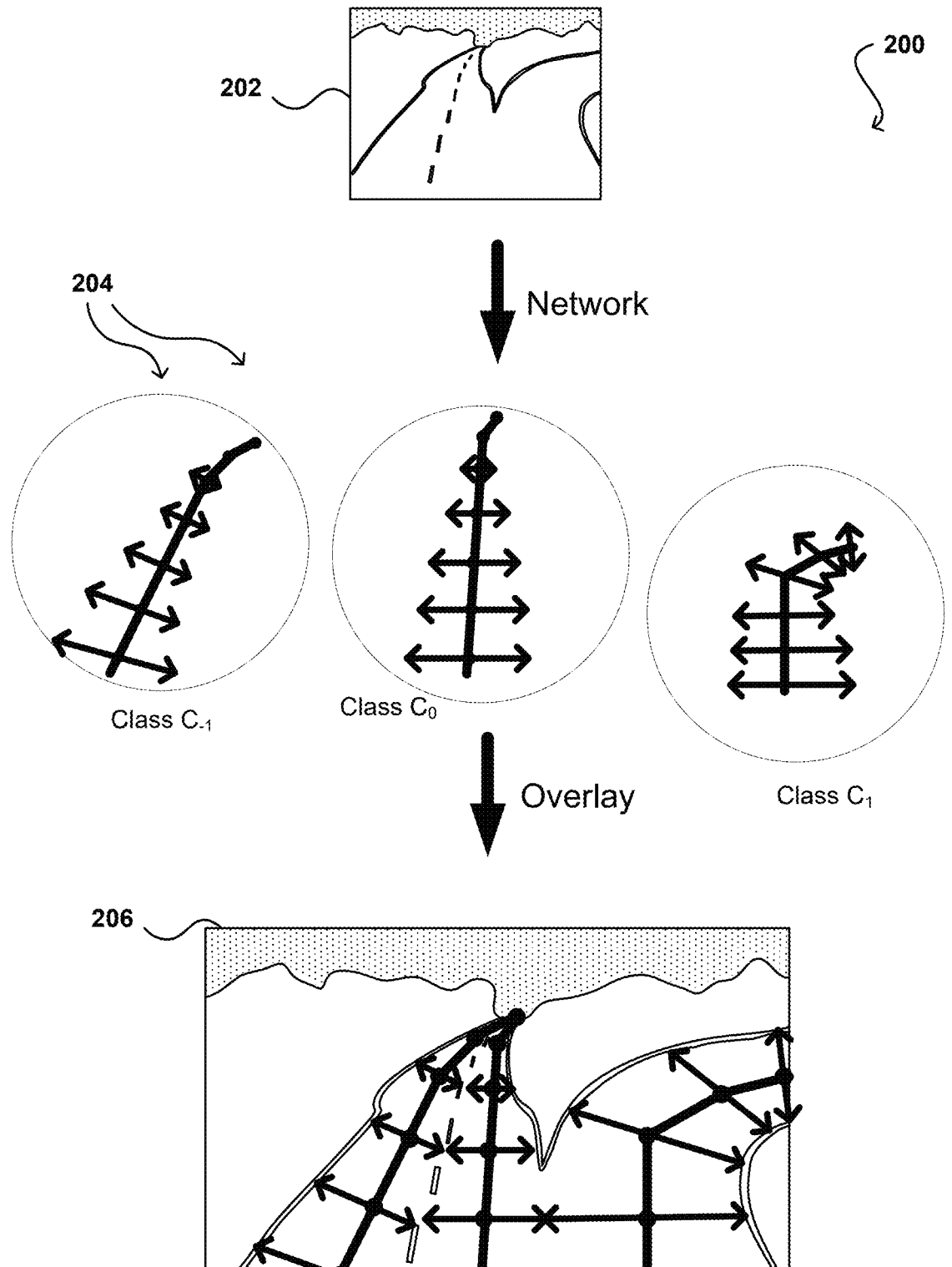
FIG. 2 illustrates an example detection-based approach to determining polylines that can be utilized in accordance with various embodiments.

FIG. 2 illustrates an example approach 200 to inferring paths based on image data that can be utilized in accordance with various embodiments. In this example, the image 202 from FIG. 1A is used again for explanation. As illustrated, the image 202 can be provided as input to a trained neural network, which can infer a number of paths. Each of these paths 204 is shown to be classified as having a certain curvature. Also as illustrated, each path is defined by a set of points running along a center of the path, with values indicating the width of the path at that location. Instead of using rectangles (i.e., bounding boxes with two vertices) or polygons (e.g., boundaries with N vertices) as in conventional approaches, these paths are instead defined by a set of polylines, each having a respective confidence score. The polylines in this example can be learnt relative to a set of priors.

Such an approach can help to address the shortcomings in autonomous vehicle operation and pathing noted above by providing a deep learning solution for autonomous vehicles that uses a more abstract definition of drivable path, treating the identification of drivable paths as a detection problem rather than a pixel classification problem. While the definition of a path and the network solution could be used separately according to various embodiments, combined they form a powerful approach that is more efficient and robust than previous solutions.

As described herein, the definition of drivable paths can include any explicit or implied path that is likely to be taken by a vehicle. This includes (but is not limited to) the two implied paths at merging and splitting lanes, the cross-traffic paths at intersections, paths where there are no road markings at all, and so on. These paths are identified visually by human annotators in driving view images to allow training of deep neural networks with images. Each path is generally (but not exclusively) annotated with a left edge and a right edge, to denote the lateral extent of the path, and the edges are labeled over their entire visible extent in an image. Paths may also be assigned a class label to denote the type of path, for example, a turning path, a path for oncoming traffic, a path for a train tracks, etc. Moreover, this concept is not limited to drivable paths, but can also include non-drivable paths, walkable paths, bike-able paths, or any other mode of locomotion that is associated with a path. Approaches in accordance with various embodiments can infer these paths based on deep neural networks (DNNs) in a way that does not require per-pixel labeling or classification. The method treats each path as an arbitrarily shaped polygon with a fixed, but configurable, number of vertices. A neural network is then used to regress the position of each of the vertices relative to one or more anchor vertices. A classification layer can also be used in parallel to classify the path type while also regressing the path location. This network approach is similar to common object detection network approaches, with one major difference: regression is performed on an arbitrary number of vertices.

An alternative to using segmentation or regression architectures is to use a detection-based architecture where the network learns a deviation from a set of path priors. This is analogous to how an object detection network learns a deviation from a set of box priors. The advantage of this approach over segmentation and regression architectures is that rather than predicting an image mask from which extensive post-processing is required to derive the path, the path can be directly predicted by the network. According to the detection approach, the network learns to predict two things: a probability that a path is a given path (could be any path or specifically labeled paths), and the location of the path as a deviation from a given prior path. Options can include polyline (i.e., piece-wise linear) curves and parameterized curves. FIG. 2 illustrates how the set of three path priors 204 can be parameterized using polylines. In this case, N points (where N is something that can be varied based on speed/accuracy trade-offs) and widths are defined for each path prior as depicted. A set of priors is then calculated as multiples of these priors with different values for the points and widths.

The network can output a set of numbers for each prior at each location. These numbers can include P confidences, where P is the number of target distinct paths to detect. The numbers can also include XN locations, where X is based on the number of dimensions of the predicted path (e.g., 2 or 3) and N is the number of desired points in the polyline. Increasing N allows for finer tuned trajectories but may be at the expense of network inference speed and training time. An approximate N can be estimated from the ground truth data and used to set our KPI upper limits for a given N. The confidences can be used to trim down the number of predicted paths to one per path using a winner-take-all procedure. Alternatively, any other variant of non-maximum suppression can be used to determine the winning curve. The polyline detection method is very flexible in estimating path shapes; however, it may require the setting of a hyperparameter N before training. To avoid this, an alternative approach instead uses parameterized curves—such as (without limitation) clothoids or cubic polynomials.

The path detection approach relies on the strong prior information about path shape to allow the network to learn the path shape as an offset from a set of predefined prior shapes. These prior shapes should capture the general variety of path shapes, though they do not need to exactly match any particular path. According to various embodiments, generating a set of path priors is performed over a number of steps. These steps can include determining locations for the priors in the image, generating a set of priors, and placing the set of priors at each location in the image.

Various embodiments can generate one small set of priors and apply them at each receptive field location in one or more layers of the network. The receptive field locations can be calculated from the topology of the network. First, one needs to indicate the layers at which the priors are to be defined. Then, for each layer, the spatial extent of the output feature map is read from the network (e.g., 20×11 for a network with a layer that is 20×11×512) and the center of each of these 20×11 receptive fields is found in image coordinates. This forms a list of receptive field x, y coordinates in the image at which to center the set of priors. These locations are referred to as the receptive field centers.

The set of priors can include any one of various types of priors, as may include base priors, linear priors, or cubic priors. Base priors can be generated based on two function types: linear and cubic polynomials. According to some embodiments linear functions may be preferable because in the majority of data coming from highways, the paths are well defined by straight lines at differing angles. Cubic functions may be preferable in some embodiments—and in combination with linear functions—for curves that are not well described by lines. An embodiment may consist of, for example, code wherein 40% of the priors are linear and 60% of the priors are cubic. This is a somewhat arbitrary assumption at this point that could be made an input, but it was assumed in order to ensure that more cubic priors are generated than linear as they have a larger variety of shapes. Each base prior can be created as just one curve, the center line of the path, in a normalized coordinate frame. The normalized coordinate frame means that the priors have a domain of $[-1, 1]$ and are centered at the origin. Each prior can also have the same number of vertices.

Linear priors are meant to capture linear paths, which once passed through a camera lens often still appear roughly linear, though with a wide variety of orientations. To generate an arbitrary number of linear priors, NL, one line is created along the x-axis spanning from $-1$ to 1 and copy and rotate this line by NL angles, where the angles are equally divided between 0 and $\pi$. For example, if 2 linear priors were requested, then the priors would be 2 lines rotated by 0 and $\pi/2$, respectively. If 4 linear priors were requested, then 4 lines rotated by angles 0, $\pi/4$, $\pi/2$, and $3*\pi/4$, respectively, would be returned.

Cubic priors are meant to capture curving paths in the image, which can take on a variety of curvatures (controlled through the parameters of the cubic function) but also orientations for the same reason straight paths often have a wide range of orientation. Cubic priors can be defined by the following function, where root indicates the intersection point with the x-axis and a is a scaling factor that is used to adjust the degree of curvature between the +/−roots. The subtraction of $a*root^3$ at the end of the equation simply removes the offset such that the curve is centered at the origin. The root is set such that the distance between the +/−roots varies between 0.5 and 1 and a is a function of the root value and varies between 28 and 3.5. These values were all determined based on an analysis of the ground truth data.

$$y=(root-x)(root+x)(a*root-x)-a*root^3$$

Similar to the linear priors, the generated priors may correspond to a set of angles to capture the range of orientations that the paths are presented in after passing through a camera lens. Thus, the number of cubic priors NC is the product of the number of angles and the number of curvatures (roots) generated. As a simplifying assumption, the cubic priors may be rotated by 4 angles: $[-\pi/2, -\pi/4, \pi/4, \pi/2]$. Thus, if 12 cubic priors are requested, then only 3 curvatures (root values) will be used and the set of 3 cubic functions rotated 4 times to produce 12 cubic priors.

Once the base line priors are generated, they are copied and translated to each of the receptive field locations identified earlier. This produces priors in image coordinates. The priors are also scaled to match the image resolution and aspect ratios such that the lengths of the priors are similar to the lengths of the paths in image coordinates. The values of the scaling in x and y were determined from an analysis of available ground truth data. Copying the priors at each receptive field location is useful for integration with convolutional networks but creates a large number of priors that is equal to the number of base priors time the number of receptive field locations. A typical example would be 20 base priors times 20×11 receptive field locations=20*20*11=4,400. Note that in object detection networks, the number of priors can be greater than 10,000.

Once a set of base (center line) priors has been created, translated and scaled, the edge priors are calculated by finding points one half-width away from the base prior along the normal to the base prior. The width of the prior is calculated from the x, y coordinate of the base line prior after translation and scaling as a function of the image width and height. This width map is generated by fitting a two-dimensional paraboloid to the widths measured in our ground truth data. The edges of the path are defined by the normal to the base prior at each point. To find the normal to the base prior, characteristics of polylines, or piecewise linear curves, can be observed. For the initial and final points, the normal to the initial and final line segment, respectively, can be used as the normal. For the points between two line segments, the mean of the normal vectors to each segment is used to find the bisecting, or normal, vector to the polyline at that point. Once the normal vector and the width for this point is found, a point to the left and right of the base prior, located one half-width in each direction, is assigned as the left and right edge points. These left and right edge points form the left and right path edges.

Once the prior edges are found, the last step is to ensure that all priors are completely contained within the image. This can be tricky since the polylines have been translated, scaled, and shifted by normal vectors and may no longer resemble the relatively simple linear and cubic functions generated at the start. To ensure all the points in the prior are within the image boundaries preferred embodiments first find any intersections of the priors and the image boundaries and then interpolate the prior within the boundaries of the image if intersections are found.

In order to interpolate a prior, it is important in at least some embodiments that the prior still forms a function, meaning that for each x-value there is only one, unique y-value. Since priors have been rotated and scaled, this may no longer hold true. Thus, to find intersections with the border, the scaling and rotation applied to the prior is reversed and the same reverse scaling and rotation is applied to the image borders. This ensures that the prior is now a function. One reason for performing the rotation and scaling first is to take into account the path edges and widths. Without first rotating, scaling and expanding the prior along the normal vectors, the wrong curves for finding intersections may be used.

To determine if the prior intersects with a border, each line segment is checked with each border segment to determine if an intersection is present. If an intersection is present, the x-coordinate of the intersection is preserved as a limit for the x-values of interpolation. Once all the border intersections are found, which intersections form the initial and final x-coordinates for interpolation are determined. If no intersection was found, the original initial and final x-values are added instead. If border intersections were found, then the prior is interpolated between the x-coordinate limits and the new prior is returned. Once the new prior has been interpolated, the rotation and scaling are reapplied to the prior to place it back in the image coordinate frame. This is the final prior. The priors are illustrated as overlays in the overlay image 206 of FIG. 2.

In various embodiments there will be a loss associated with each of the points, as may correspond to how far way a predicted point is from a ground truth. Those losses can then be summed for the entire path or polyline. As mentioned, however, it might be desirable to have a smaller loss near the base and a larger loss in the distance, so approaches in accordance with various embodiments can attempt to scale the loss with distance. For example, a large scaling factor may be applied for nearby points, and that scaling factor can decrease with distance along the path. The scaling might be linear with distance, but in many embodiments will be a function of the curvature because the amount of uncertainty can vary with curvature as discussed elsewhere herein. As mentioned, for driving it might be desirable to weight the close points more heavily, as it can be desirable for the immediate car actions to be based on very accurate information.

As mentioned, the priors can take any of a number of forms. Locating individual points in the middle of a lane and determining an offset has been proven to provide an accurate representation, as discussed with respect to FIG. 2. It should be understood, however, that various other priors can be used or generated for such purposes as well within the scope of the various embodiments. Such approaches enable path determination to be treated as a purely geometric problem. Various approaches attempt to have the neural network solve that geometric problem such that a separate module is not needed to interpret the output of the network.

For polylines, labels can be obtained from a human annotator for training purposes, where it can have an arbitrary number of points and there is no constraint on the spacing of those points. An interpolation can be performed along that polyline to a set number of points, such as to get twenty center points. Such an approach enables each polyline in the image to be represented by a corresponding number of points. In other embodiments interpolation can be performed with constant arc length along the polyline. A coordinate can then be selected at given intervals, such as at every ten pixels along the arc length. Such an approach can instead make sure that every point is spaced exactly the same arc length apart, but can result in a different number of points per polyline. Logarithmic spacing can also be performed in other embodiments, along with other such options.

Figure 3:
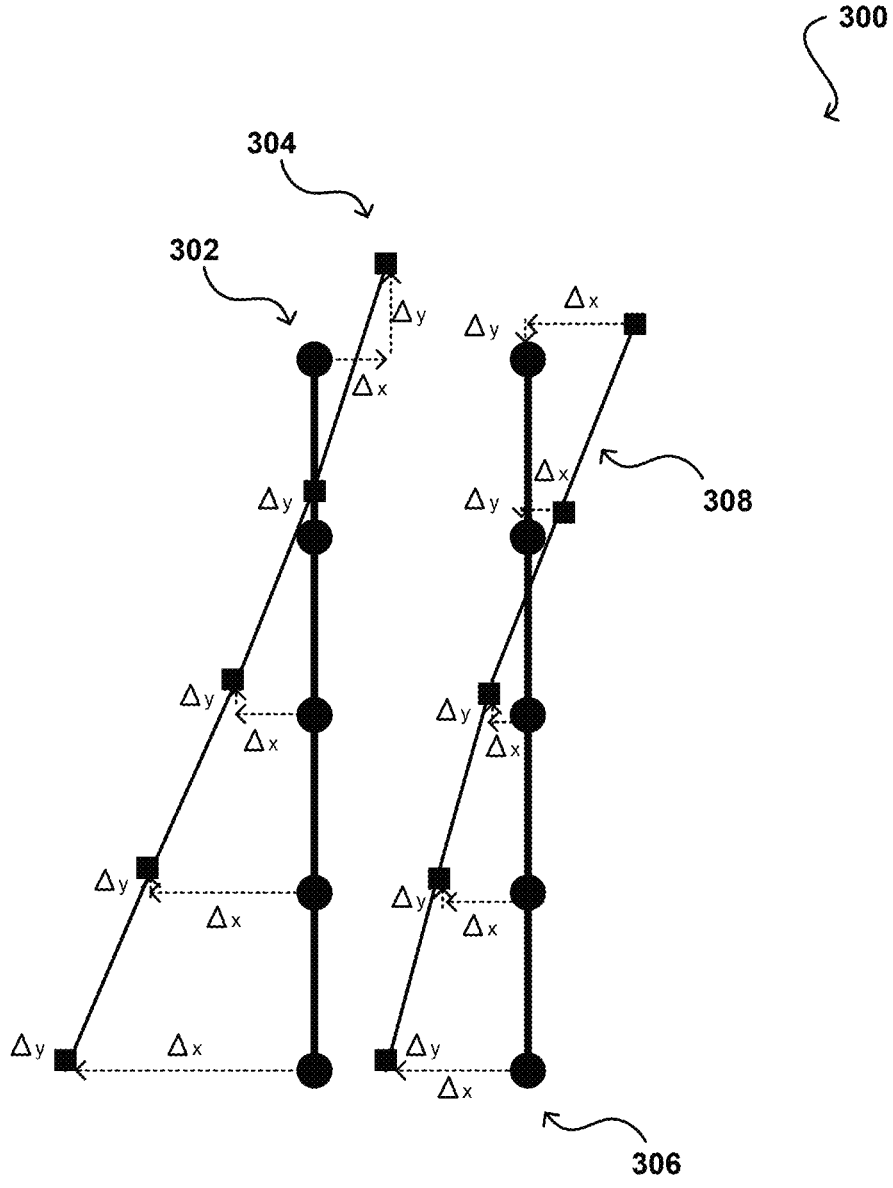
FIG. 3 illustrates an example approach to training a network using loss values that can be utilized in accordance with various embodiments.

FIG. 3 illustrates an example image 300 that can be used to train the network. Illustrated in the pair of substantially vertical lines 302, 306 correspond to the determined prior. The leftmost angled polyline 304 is the left edge, and the rightmost angled polyline 308 is the right edge. Training in one embodiment can use a number of priors as illustrated, with a number of vertices per edge, such as ten vertices per edge. The delta values illustrated can correspond to the path offsets and class probabilities for each prior, which can be used to determine the loss, as may be given by:

$$\text{loss} = binarycrossentropy(c_i) + \propto * \sum_{p=1}^{N_{gt}} \sum_{v=1}^{N_{vertices}*4} \text{abs}(x_{p,v} - \widehat{x_{p,v}})$$

The training procedure thus can look at a linear prior as an inference, and then can learn the offset from each of the labeled points, which correspond to the left edge and the right edge in the figure. This enables determining the delta values for both x and y, which is what the network is trying to learn. Subtracting the expected from the observed value can then provide a measure of loss for that particular location. As mentioned, a scaling factor can then be applied to this loss based in part upon the location of the point along the polyline. The primary path is the ego-path, and along with the left adjacent path and the right adjacent path, the binary cross entropy provides a measure of the quality of the prediction for each.

Figure 4:
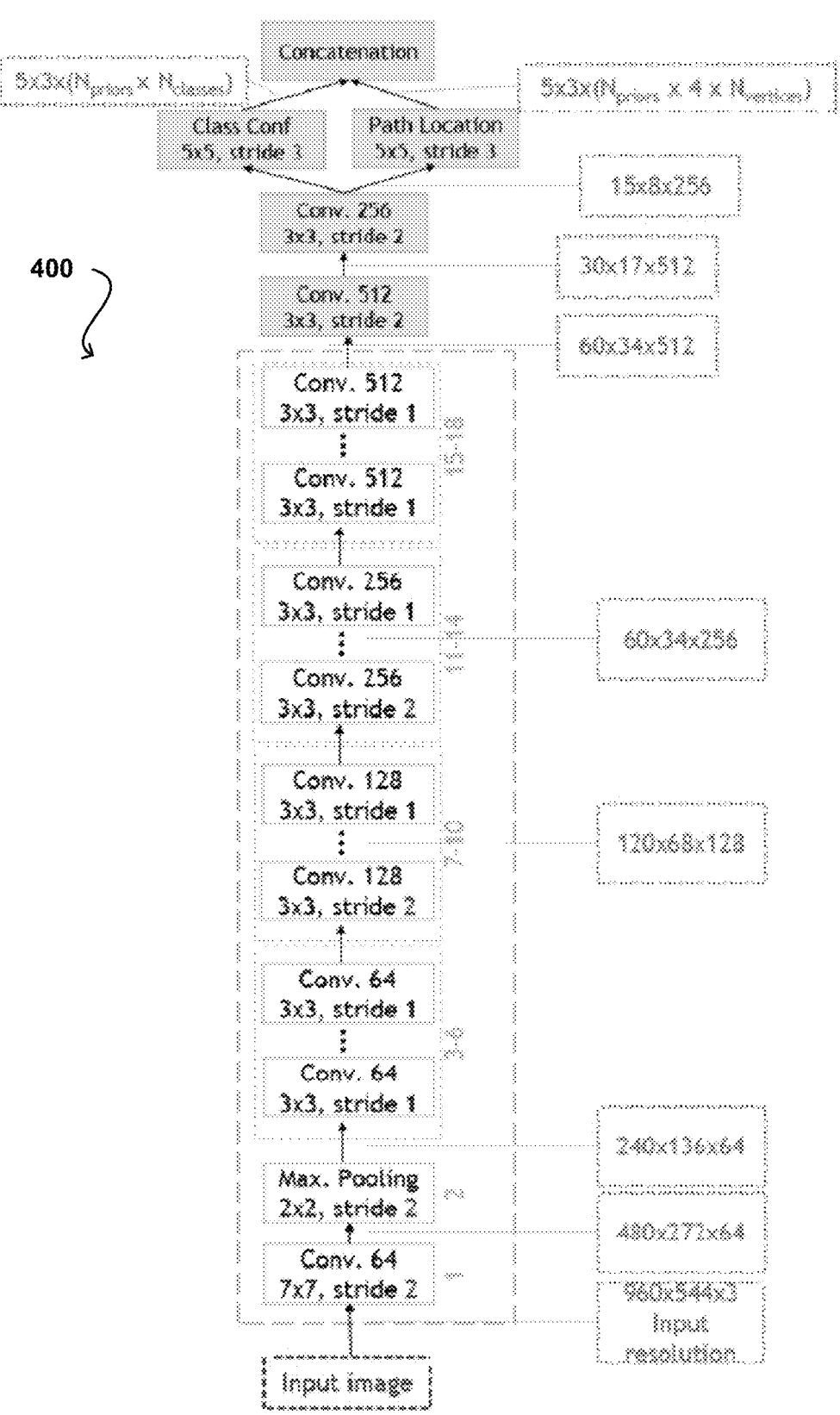
FIG. 4 illustrates an example network architecture that can be utilized in accordance with various embodiments.

FIG. 4 illustrates an example neural network architecture 400 that can be used to perform the detection approach.

According to one or more preferred embodiments, the network can produce class labels (i.e., pre-defined path descriptions), path locations (vertices in 2D or 3D space), or both. Each output type may employ a separate layer to enforce difference loss functions, or may be combined and a common loss function may be used. Each layer will contain a confidence for each class and/or the locations of vertices in the polygon output. The neural network architecture may comprise (without limitation), a feature extractor composed of a number of convolutional and pooling layers. A detailed description of the feature extractor can be found in "Methods for accurate real-time object detection and for determining confidence of object detection suitable for autonomous vehicles" U.S. Patent Application No. 62/631,781, filed Feb. 18, 2018, and incorporated herein by reference in its entirety.

According to various embodiments, post-processing for the detection approach can be applied using one or more different implementations, depending on the particular embodiment. These implementations may include, without limitation, (1) a winner-take-all approach, (2) a non-maximum suppression approach, and (3) a density-based spatial clustering of applications with noise (DBSCAN) approach. The winner-take-all approach is based on the confidence scores for each path (in other words, path with the highest confidence for being the ego path is selected as the ego path). The non-maximum suppression approach is based on the confidences of paths that are within a pre-specified sum distance from each other. Sum distance is calculated by summing the distances between M points along two paths, where the M points are selected at the same M arclengths along the two paths.

Figure 5:
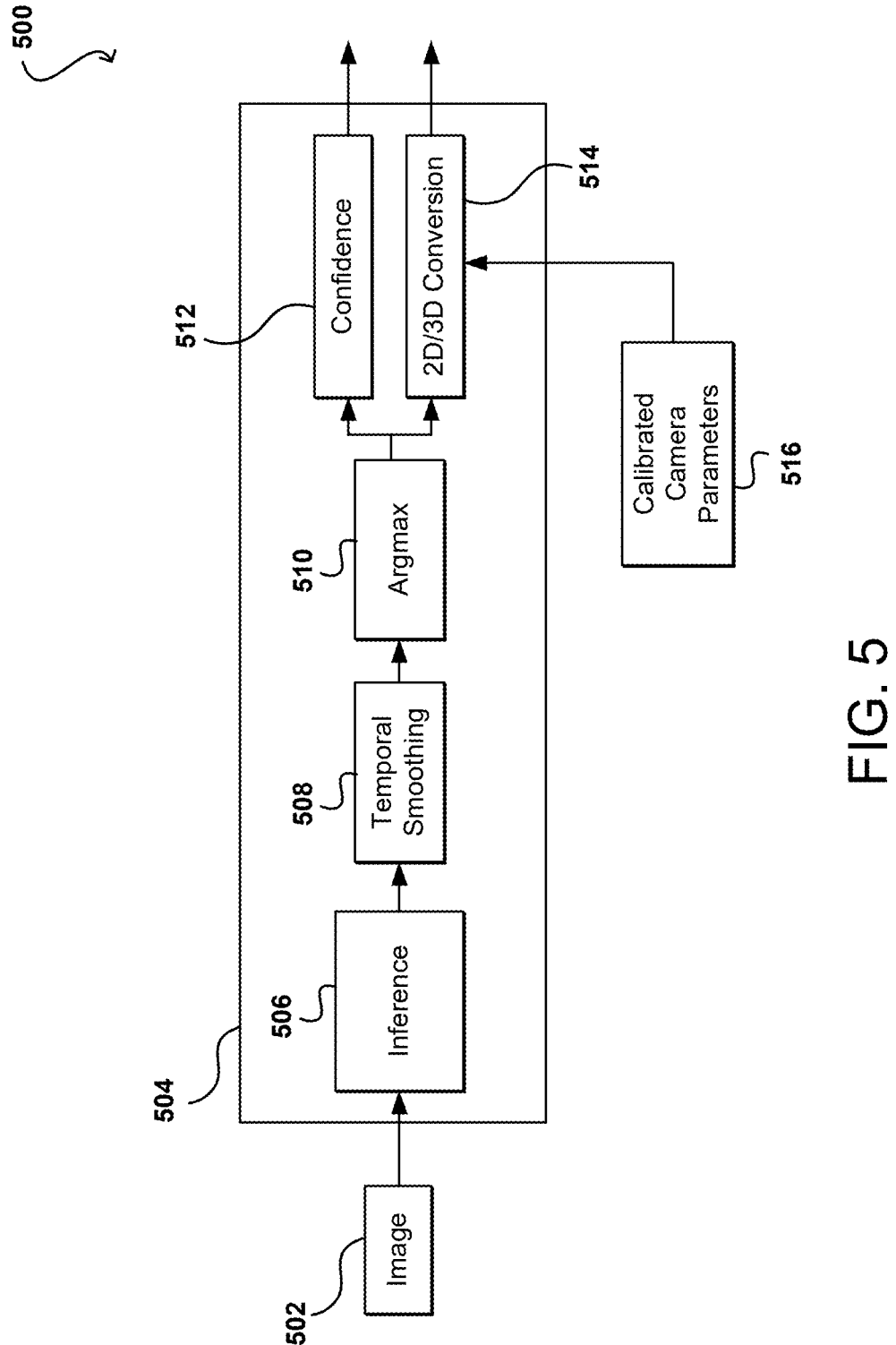
FIG. 5 illustrates an example inference pipeline in accordance with various embodiments.

FIG. 5 illustrates an example inference pipeline 500 that can be utilized in accordance with various embodiments. In this example, the image data 502 is captured and fed into the inferencing system 504, wherein the image data can be analyzed to generate one or more path inferences 506 using the trained network. A temporal smoothing component 508 can be used to perform some post-processing of the inference data. At each prior location, there can be n class outputs. Each output can contain a confidence value for each class and an offset from the location of its prior. The temporal smoothing can generate an output that is a factor of the current frame detection as well as the prior frame detection, in order to prevent rapid changes in path determinations between frames as may occur as the result of sudden exposure changes or other such factors. Such post-processing can also help to improve path stability at far distances.

The output can be fed to another post-processing component, here an argmax component 510. The argmax, or arguments of the maxima, are the points of the domain of a function at which the function values are maximized. In other words, the argmax determines the inputs or arguments at which the function outputs are maximized. In the argmax component 510, an input class can consist of the determined path and one or more adjacent paths. A path offset can be determined that has the highest confidence for the class, and the path can then be determined to correspond to the path offset added to the prior location, with the result being scaled to the image size. If there are twenty priors, they will each predict the ego path with some confidence. The argmax attempts to determine the prior with the highest confidence for the ego path, which will be selected as the appropriate path. The argmax component then determines the maximum confidence value, and designates the corresponding index as indicating the ego path. A similar process can be performed for the left and right paths, etc.

The argmax result will be provided as the result as long as the confidence value for the path at least satisfies a minimum confidence threshold, as may be determined using a confidence module 512 in some embodiments. The calibrated camera parameters 516 may also be received as input that can help to perform the two-dimensional to three-dimensional conversion, such that any artifacts that might result from the camera can be accounted for when converting the two-dimensional image into three-dimensional path information that can be utilized for navigation purposes.

As mentioned, approaches in various embodiments can attempt to remove the bias from the training datasets. This can be accomplished by weighting the loss calculated for each path as a function of the curvature of that path. By scaling the loss by the inverse of the frequency of a particular curvature, a balanced set of gradients can be achieved. To measure curvature quickly and effectively, a proxy measure called the sum angle ratio can be used in some embodiments. The sum angle ratio can be calculated by comparing the sum of interior angles between adjacent line segments to the sum of those angles if the line segments were co-linear (always 180 degrees). This ratio will range between 0 and 1 and decrease as the total curvature of the path increases. This measure does not currently take in to account the direction of the curvature, but since our main aim with this measure is to reduce the bias and amplify the effect of our curved paths, in any direction, this measure will suffice.

In an example path data, each path can consist of two polylines. Thus, to get one sum angle ratio for each path, the sum angle ratios of each edge can be averaged. The sum angle ratio can be computed for each edge after interpolation so that each edge has the same number of line segments. To determine how to map the sum angle ratio into a weight for the loss, the frequency or probability of angle ratios can be measured in our data. To remove the bias in the data, the loss associated with a given path can be weighted by the inverse of the probability of that path type, which in this case is the path's sum angle ratio. Rather than store a table of probability values, because the distribution of probabilities of sum angle ratios is relatively smooth and nicely behaved, a function can be fit to the empirical histogram and define a probability function analytically that can be evaluated per path. Based on the histograms above, the probability function chosen was a double exponential of the following form. The parameters of the equation can be determined through least-squares curve fitting. The parameters and the distribution shape itself may change with each dataset and so should be modified to reflect the actual distribution of probabilities in the dataset one is using.

To convert the probability into a weighting function, the following equation can be used:

$$\text{probability} = p_1 e^{\frac{p_5 * sum\_angle\_ratio}{p_6}} + p_4 e^{\frac{p_5 * sum\_angle\_ratio}{p_6}}$$

This function is monotonically increasing with decreasing probability and ensures that the loss associated with paths with less common sum angle ratios is weighted higher. As expected, after weighting, the histogram is much closer to uniform across the range of sum angle ratios. To make it exactly uniform a look-up table may need to be used in some embodiments. Because the probability function is an empirical measure over a given dataset, it can be important to re-evaluate the weighting function for each dataset.

Figure 6:
FIG. 6 illustrates an example process for inferring a path from image data that can be utilized in accordance with various embodiments.
Figure 6:
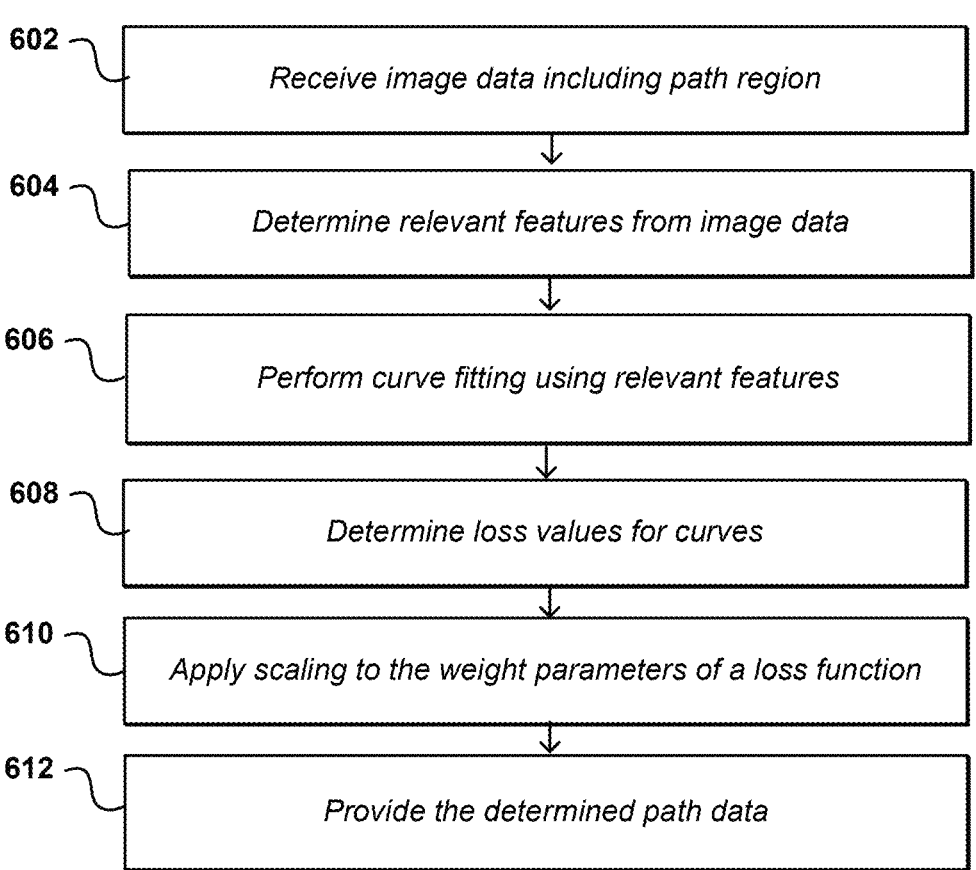

FIG. 6 illustrates an example process 600 for inferring a navigation path that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although deep neural networks (e.g., CNNs and RNNs) are provided as an example it should be understood that other models, networks, algorithms, or approaches can benefit from training techniques discussed and suggested herein. In this example, image data is received 602 that includes a path region or environment in which navigation is to occur. As mentioned, in some embodiments this can include receiving image data from one or more cameras on an object to be navigated, or for which navigation information is to be generated, among other such options. Other types of data can be received and analyzed as well, as may include video data, LIDAR data, radar data, ultrasonic data, audio data, and the like. The image data may be preprocessed in at least some embodiments. The image data can then be analyzed to determine 604 relevant features from the image data. For vehicles, this may include road markers, lane markers, and the like. In this example, a function can be fit to a relevant subset of the features, as may involve performing 606 curve fitting using relevant features for a lane of travel. The function may include any appropriate function, although non-linear functions may provide improved performance in at least some embodiments as discussed herein. As mentioned, curve or function fitting is not required in all embodiments.

One or more potential path curves can be obtained. For each of these curves, the loss values can be determined 608, which may include a loss value or weight for each point along the curve. As mentioned, the curves may have an equal number of points with uneven spacing, or an uneven number of points with even spacing, among other such options. Scaling can then be applied 610 to the loss values, where the scaling can be at least a function of distance. As mentioned, this can allow the fitting to favor points closer to, or further away from, the object to be navigated as determined from the image data. The scaling in various embodiments will also be a function of the shape or curvature of the curve or function fit to the feature points for each proposed path. Path data can then be provided 612 that is based in part upon the scaling. In some embodiments the selected path can then be converted to three-dimensional path information that can be provided to a navigation or control system for the object to be navigated.

As mentioned, an increasing variety of industries and applications are taking advantage of machine learning. As an example, deep neural networks (DNNs) developed on processors have been used for diverse use cases, from self-driving cars to faster drug development, from automatic image analysis for security systems to smart real-time language translation in video chat applications. Deep learning is a technique that models the neural learning process of the human brain, continually learning, continually getting smarter, and delivering more accurate results more quickly over time A child is initially taught by an adult to correctly identify and classify various shapes, eventually being able to identify shapes without any coaching. Similarly, a deep learning or neural learning system designed to accomplish a similar task would need to be trained for it to get smarter and more efficient at identifying basic objects, occluded objects, etc., while also assigning context to those objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher-level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations, identifying and classifying different types of automobiles, pedestrians, and road hazards in driverless cars, or translating human speech in near real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 7:
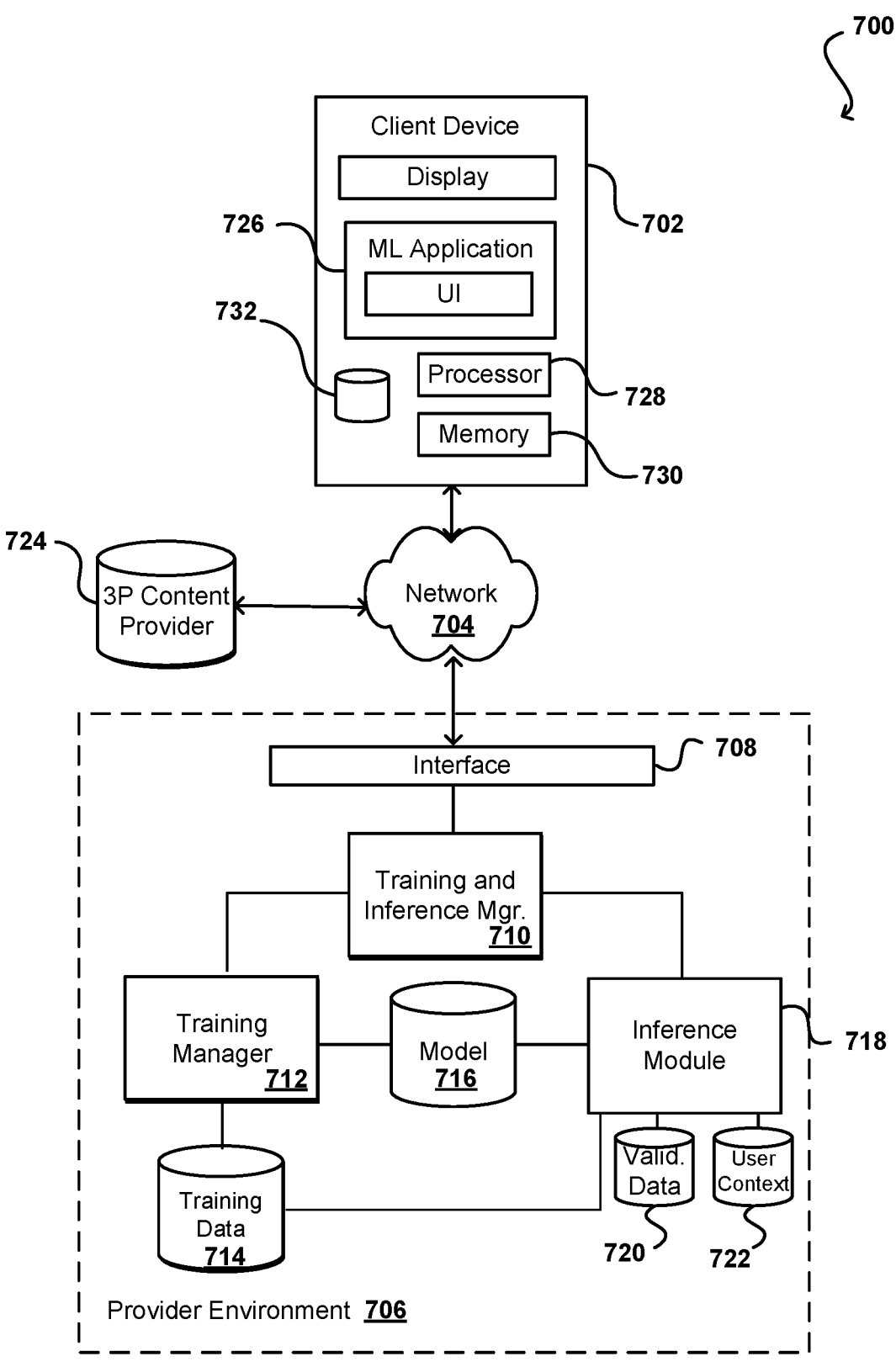
FIG. 7 illustrates an example system that can be utilized to implement aspects of the various embodiments.

FIG. 7 illustrates components of an example system 700 that can be used to train and utilize machine learning in accordance with various embodiments. As will be discussed, the various components can be provided by various combinations of computing devices and resources, or a single computing system, which may be under the control of a single entity or multiple entities. Further, various aspects may be triggered, initiated, or requested by different entities. For example, in some embodiments the training of a neural network might be instructed by a provider associated with the provider environment 706, while in other embodiments the training might be requested by a customer or other user having access to the provider environment through a client device 702 or other such resource. The training data (or data to be analyzed by the trained neural network) can be provided by the provider, the user, or a third party content provider 724, among other such options. In some embodiments, the client device 702 may be a vehicle or object that is to be navigated on behalf of a user, for example, which can submit requests and/or receive instructions that assist in navigation of the device.

In this example, requests are able to be submitted across at least one network 704 to be received to a provider environment 706. The client device may be any appropriate electronic and/or computing devices enabling the user to generate and send such requests, as may include desktop computers, notebook computers, computer servers, smartphones, tablet computers, gaming consoles (portable or otherwise), computer processors, computing logic, and set-top boxes, among other such options. The network(s) 704 can include any appropriate network for transmitting the request or other such data, as may include the Internet, an intranet, an Ethernet, a cellular network, a local area network (LAN), a network of direct wireless connections among peers, and the like.

Requests can be received to an interface layer 708, which can forward the data to a training and inference manager 710 in this example. The manager can be a system or service including hardware and software for managing requests and service corresponding data or content in at least some embodiments. The manager can receive a request to train a neural network, and can provide data for the request to a training manger 712. The training manager 712 can select an appropriate model or network to be used, if not specified by the request, and can train the model using relevant training data. In some embodiments the training data can be a batch of data stored to a training data repository 714, received from the client device 702 or obtained from a third party provider 724, among other such options. The training manager 712 can be responsible for training the data, such as by using a LARC-based approach as discussed herein. The network can be any appropriate network, such as a recurrent neural network (RNN) or convolutional neural network (CNN), among other such options. Once a network is trained and successfully evaluated, the trained network can be stored to a model repository 716, for example, that may store different models or networks for users, applications, or services, etc. As mentioned, in some embodiments there may be multiple models for a single application or entity, as may be utilized based on a number of different factors.

At a subsequent point in time, a request may be received from the client device 702 (or another such device) for content (e.g., path determinations) or data that is at least partially determined or impacted by the trained neural network. The request can include, for example, input data to be processed using the neural network to obtain one or more inferences or other output values, classifications, or predictions. The input data can be received to the interface layer 708 and directed to the inference module 718, although a different system or service can be used as well in various embodiments. The inference module 718 can obtain the appropriate trained network, such as a trained deep neural network (DNN) as discussed herein, from the model repository 716 if not already stored locally to the inference module 718. The inference module 718 can provide the data as input to the trained network, which can then generate one or more inferences as output. This may include, for example, a classification of an instance of the input data. The inferences can then be transmitted to the client device 702 for display or other communication to the user. Context data for the user may also be stored to a user context data repository 722, which may include data about the user which may be useful as input to the network in generating the inferences, or determining the data to return to the user after obtaining the instances, among other such options. Relevant data, which may include at least some of the input or inference data, may also be stored to a local database 720 for processing future requests. In some embodiments, the user can use account or other information to access resources or functionality of the provider environment. If permitted and available, user data may also be collected and used to further train the models, in order to provide more accurate inferences for future requests. Requests may be received through a user interface to a machine learning application 726 executing on the client device 702 in some embodiments, and the results displayed through the same interface. The client device can include resources such as a processor 728 and memory 730 for generating the request and processing the results or response, as well as at least one data storage element 732 for storing data for the machine learning application 726.

In various embodiments a processor 728 (or a processor of the training manager 712 or inference module 718) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Figure 8:
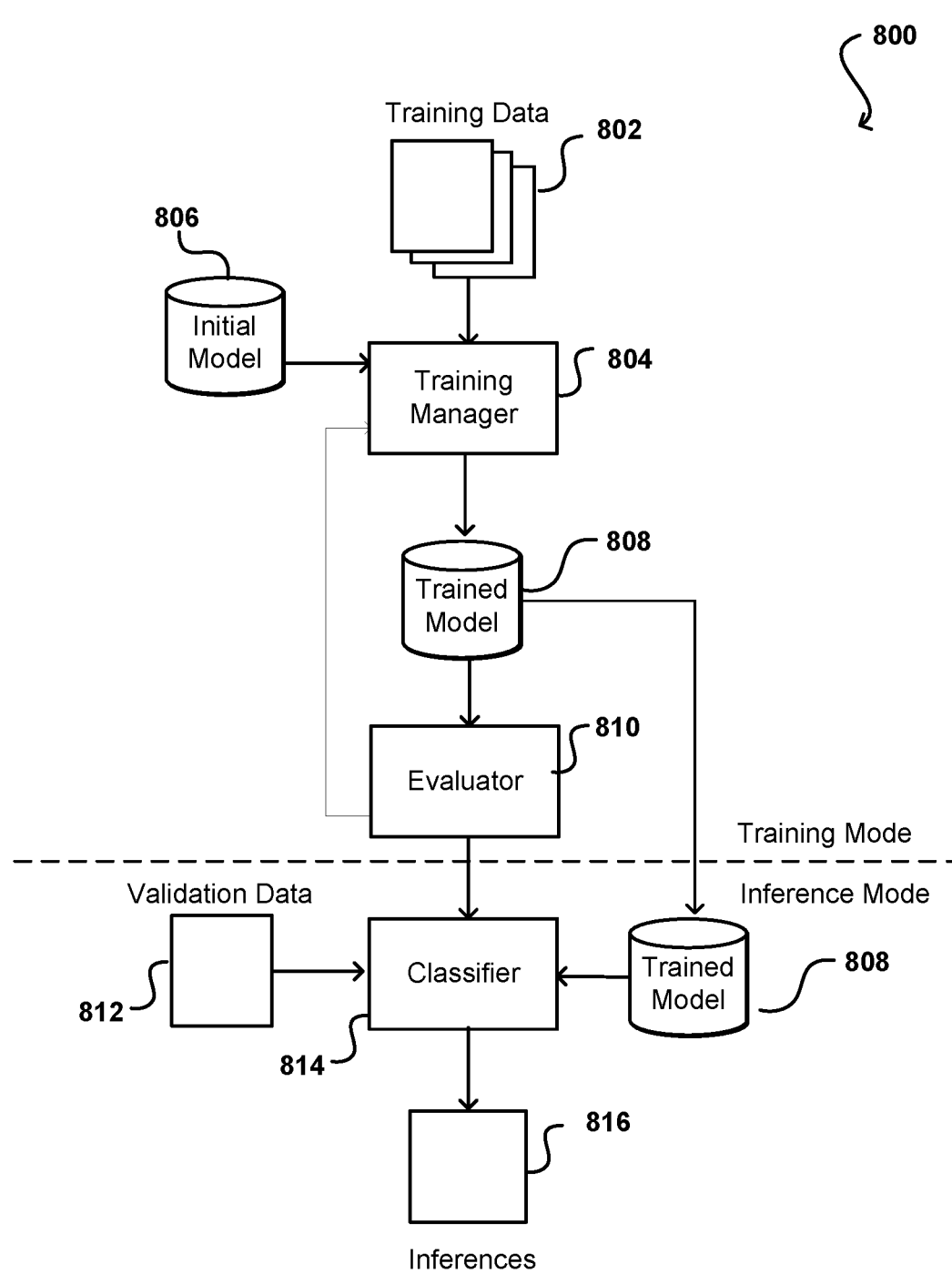
FIG. 8 illustrates an example system for training and utilizing a neural network that can be utilized in accordance with various embodiments.

FIG. 8 illustrates an example system 800 that can be used to classify data, or generate inferences, in accordance with various embodiments. Various types of predictions, labels, or other outputs can be generated for input data as well, as should be apparent in light of the teachings and suggestions contained herein. Further, both supervised and unsupervised training can be used in various embodiments discussed herein. In this example, a set of training data 802 (e.g., classified or labeled data) is provided as input to function as training data. The training data can include instances of at least one type of object for which a neural network is to be trained, as well as information that identifies that type of object. For example, the training data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The training data 802 in this example is provided as training input to a training manager 804. The training manager 804 can be a system or service that includes hardware and software, such as one or more computing devices executing a training application, for training the neural network (or other model or algorithm, etc.). In this example, the training manager 804 receives an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 804 can select an initial model, or other untrained model, from an appropriate repository 806 and utilize the training data 802 to train the model, generating a trained model 808 (e.g., trained deep neural network) that can be used to classify similar types of data, or generate other such inferences. In some embodiments where training data is not used, the appropriate initial model can still be selected for training on the input data per the training manager 804.

A model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager 804 can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager 804 in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data. If the patterns are few and simple, the resulting model will be small. Input data that has a large number of raw attributes (input columns) or derived features (outputs of the data transformations) will likely have more patterns found and stored during the training process.

In some embodiments, the training manager 804 can make multiple passes or iterations over the training data to attempt to discover patterns. There may be a default number of passes, such as ten passes, while in some embodiments up to a maximum number of passes may be set, such as up to one hundred passes. In some embodiments there may be no maximum set, or there may be a convergence criterion or other factor set that will trigger an end to the training process. In some embodiments the training manager 804 can monitor the quality of patterns (i.e., the model convergence) during training, and can automatically stop the training when there are no more data points or patterns to discover. Data sets with only a few observations may require more passes over the data to obtain sufficiently high model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict an object. The data might be sorted by object type before uploading. The algorithm can then process the data alphabetically by object type, encountering only data for a certain object type first. The model will begin to learn patterns for that type of object. The model will then encounter only data for a second object type, and will try to adjust the model to fit that object type, which can degrade the patterns that fit that the first object type. This sudden switch from between object types can produce a model that does not learn how to predict object types accurately.

Shuffling can be performed in some embodiments before the training data set is split into training and evaluation subsets, such that a relatively even distribution of data types is utilized for both stages. In some embodiments the training manager 804 can automatically shuffle the data using, for example, a pseudo-random shuffling technique.

When creating a machine learning model, the training manager 804 in some embodiments can enable a user to specify settings or apply custom options. For example, a user may specify one or more evaluation settings, indicating a portion of the input data to be reserved for evaluating the predictive quality of the machine learning model. The user may specify a policy that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 808 can be provided for use by a classifier 814 in classifying (or otherwise generating inferences for) validation data 812. As illustrated, this involves a logical transition between a training mode for the model and an inference mode for the model. In many embodiments, however, the trained model 808 will first be passed to an evaluator 810, which may include an application, process, or service executing on at least one computing resource (e.g., a CPU or GPU of at least one server) for evaluating the quality (or another such aspect) of the trained model. The model is evaluated to determine whether the model will provide at least a minimum acceptable or threshold level of performance in predicting the target on new and future data. If not, the training manager 804 can continue to train the model. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the training data 802 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 808 and the evaluator 810 can determine the accuracy of the model by comparing the ground truth data against the corresponding output (or predictions/observations) of the model. The evaluator 810 in some embodiments can provide a summary or performance metric indicating how well the predicted and true values match. If the trained model does not satisfy at least a minimum performance criterion, or other such accuracy threshold, then the training manager 804 can be instructed to perform further training, or in some instances try training a new or different model, among other such options. If the trained model 808 satisfies the relevant criteria, then the trained model can be provided for use by the classifier 814.

When creating and training a machine learning model, it can be desirable in at least some embodiments to specify model settings or training parameters that will result in a model capable of making the most accurate predictions.

Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise validation data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer data (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 800 of FIG. 8, the trained model 810 after evaluation is provided, or made available, to a classifier 814 that is able to use the trained model to process validation data. This may include, for example, data received from users or third parties that are not classified, such as query images that are looking for information about what is represented in those images. The validation data can be processed by the classifier using the trained model, and the results 816 (i.e., the classifications or predictions) that are produced can be sent back to the respective sources or otherwise processed or stored. In some embodiments, and where such usage is permitted, the now-classified data instances can be stored to the training data repository, which can be used for further training of the trained model 808 by the training manager. In some embodiments the model will be continually trained as new data is available, but in other embodiments the models will be retrained periodically, such as once a day or week, depending upon factors such as the size of the data set or complexity of the model.

The classifier 814 can include appropriate hardware and software for processing the validation data 812 using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 800 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 9:
FIG. 9 illustrates layers of an example neural network that can be utilized in accordance with various embodiments.
Figure 9:
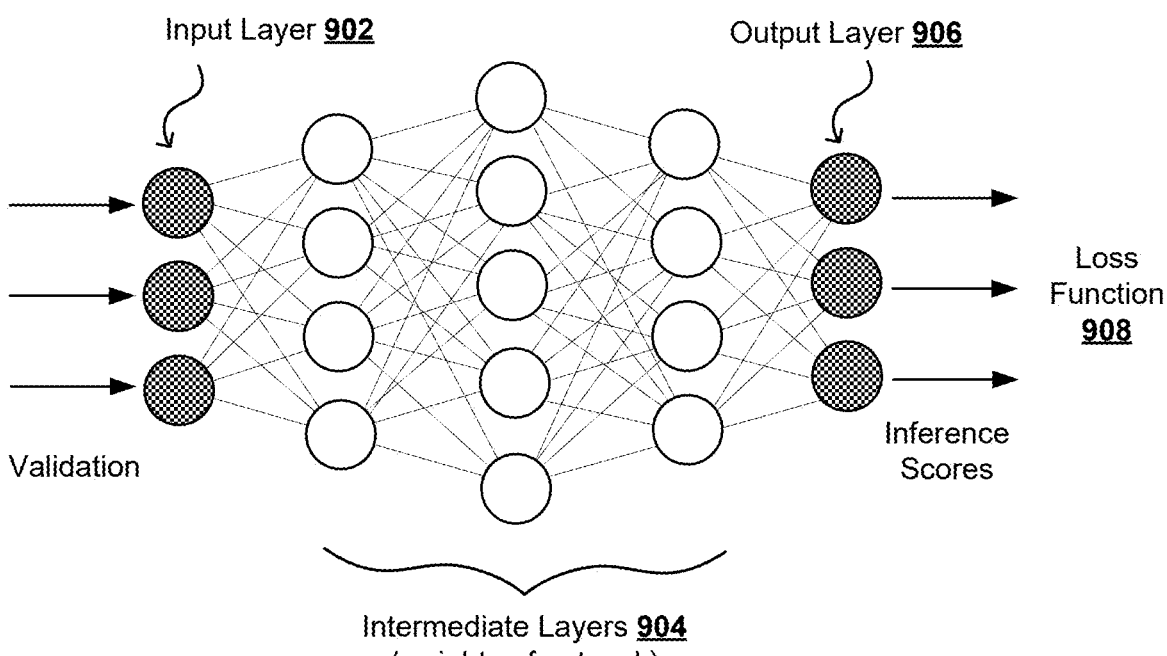

FIG. 9 illustrates an example neural network 900 that can be trained or otherwise utilized in accordance with various embodiments. In this example the statistical model is an artificial neural network (ANN) that includes a multiple layers of nodes, including an input layer 902, an output layer 906, and multiple layers 904 of intermediate nodes, often referred to as "hidden" layers, as the internal layers and nodes are typically not visible or accessible in conventional neural networks. Although only a few intermediate layers are illustrated for purposes of explanation, it should be understood that there is no limit to the number of intermediate layers that can be utilized, and any limit on the layers will often be a factor of the resources or time required for processed using the model. As discussed elsewhere herein, there can be additional types of models, networks, algorithms, or processes used as well, as may include other numbers or selections of nodes and layers, among other such options. Validation data can be processed by the layers of the network to generate a set of inferences, or inference scores, which can then be fed to a loss function 908.

In this example network 900, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (i.e., translating words to vectors), CNN architecture definition (for example, filter sizes, number of filters), stochastic gradient descent (SGD) parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 10A:
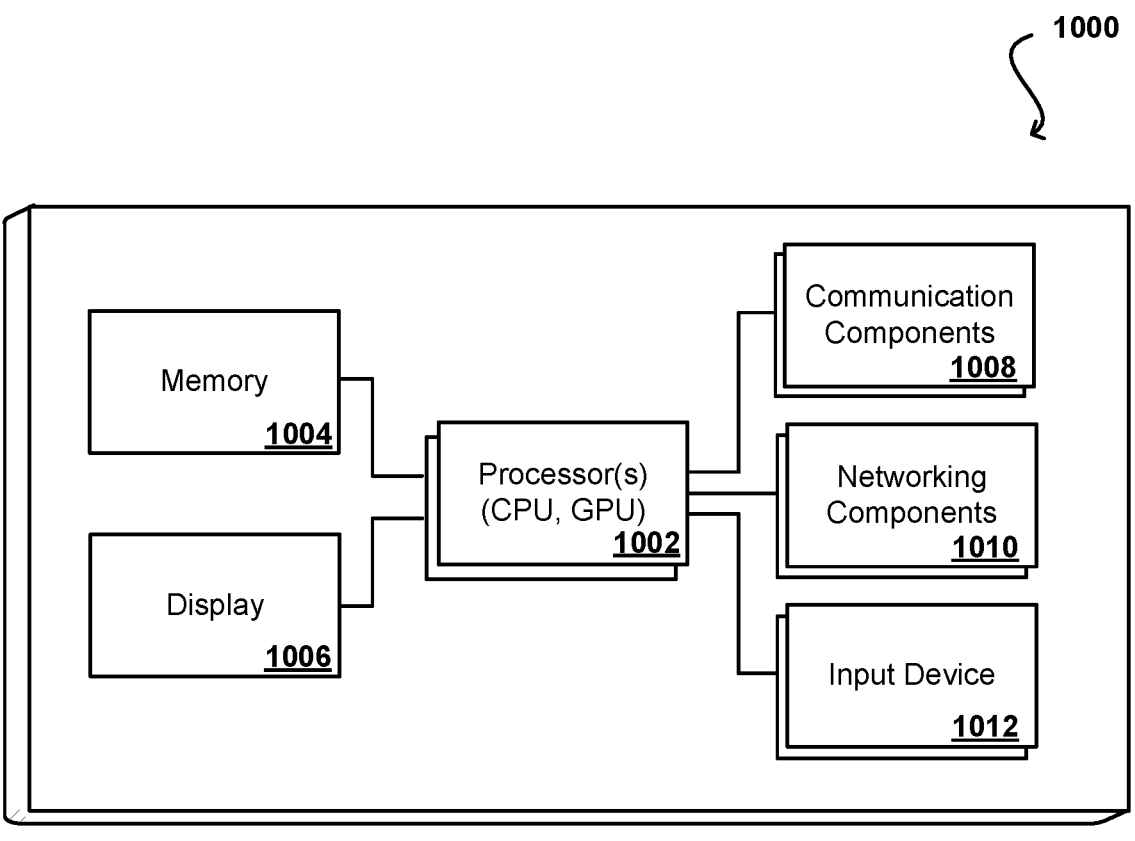
FIGS. 10A and 10B illustrate example components of a computing device that can be used to implement aspects of the various embodiments.

FIG. 10A illustrates a set of basic components of a computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, organic light emitting diode (OLED) or liquid crystal display (LCD), although devices such as portable media players might convey information via other means, such as through audio speakers. As discussed, the device in many embodiments will include at least communication component 1008 and/or networking components 1010, such as may support wired or wireless communications over at least one network, such as the Internet, a local area network (LAN), Bluetooth®, or a cellular network, among other such options. The components can enable the device to communicate with remote systems or services. The device can also include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10B:
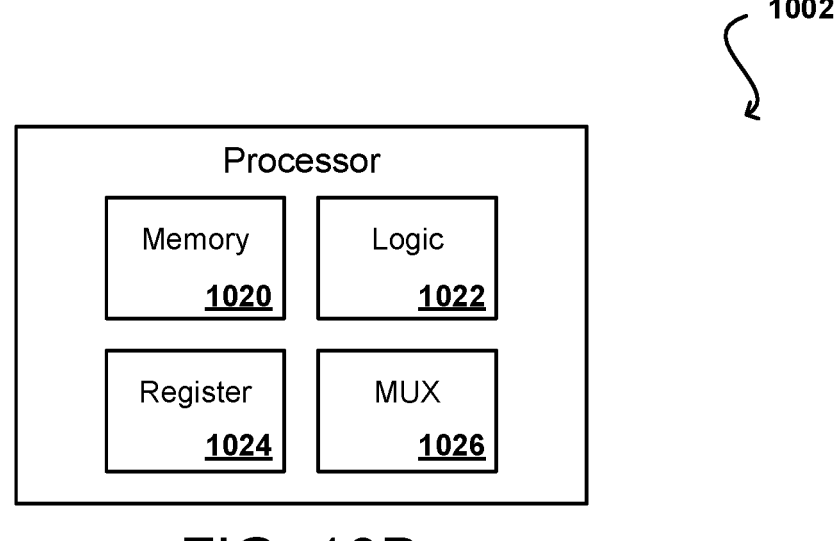

FIG. 10B illustrates example components of one of the processors 1002 of FIG. 10A. In this example, the processor 1002 can include logic 1022 for performing certain tasks, such as may include frame generation logic for generating images or video frames as discussed herein. The logic can include any appropriate logic components, as may include one or more arithmetic logic units (ALUs), specialized hardware, decoders, field programmable gate arrays (FPGAs), configurable logic blocks (CLBs), and the like. In one embodiment, the logic may be configured using a trained neural network, whereas in other embodiments the logic may generate the new video frame using fixed logic or programmable logic. The processor 1002 can contain other elements as well, as may include memory 1020 for storing data to be processed, one or more registers 1024 for holding data, addresses, or instructions, and one or more multiplexers 1026 for managing data signals, among other such options.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes May be made thereunto without departing from the broader spirit and scope of the invention as set forth in the claims.

What is claimed is:

1. One or more processors comprising: circuitry to:
identify a distribution of different geometric features of one or more paths within a plurality of images;
determine a relative frequency of the different geometric features based on the distribution;
calculate loss values based, at least in part, on one or more outputs generated by one or more neural networks using the plurality of images;
compute scaled loss values by scaling at least one of the loss values based, at least in part, on the relative frequency of the different geometric features; and
update the one or more neural networks to predict one or more additional paths of one or more vehicles based, at least in part, on the scaled loss values.

2. The one or more processors of claim 1, wherein the different geometric features comprise at least one of distances between objects, pixel locations of path features represented in the plurality of images, or pixel locations of lens distortions represented in the plurality of images.

3. The one or more processors of claim 1, wherein the scaling of the loss values is further based, at least in, part on an inverse of a frequency of a geometric feature indicated by the distribution of the different geometric features.

4. The one or more processors of claim 1, wherein the distribution of the different geometric features is indicated by one or more histograms.

5. The one or more processors of claim 1, wherein the different geometric features include one or more curvatures.

6. The one or more processors of claim 1, wherein the one or more additional paths are for use in navigating the one or more vehicles.

7. The one or more processors of claim 1, wherein the one or more additional paths correspond to a highest confidence score that at least satisfies a minimum confidence threshold.

8. A system comprising:
one or more computers comprising one or more processors to:
identify a distribution of different geometric features of one or more paths within a plurality of images;
determine a relative frequency of the different geometric features based on the distribution;
calculate loss values based, at least in part, on one or more outputs generated by one or more neural networks using the plurality of images;
compute scaled loss values by scaling at least one of the loss values based, at least in part, on the relative frequency of the different geometric features; and
update the one or more neural networks to predict one or more additional paths of one or more vehicles based, at least in part, on the scaled loss values.

9. The system of claim 8, wherein the different geometric features comprise at least one of distances between objects, pixel locations of path features represented in the plurality of images, or pixel locations of lens distortions represented in the plurality of images.

10. The system of claim 8, wherein the scaling of the loss values is further based, at least in, part on an inverse of a frequency of a geometric feature indicated by the distribution of the different geometric features.

11. The system of claim 8, wherein distribution of the different geometric features is indicated by one or more histograms.

12. The system of claim 8, wherein the different geometric features include one or more curvatures.

13. The system of claim 8, wherein the one or more additional paths are for use in navigating the one or more vehicles.

14. The system of claim 8, wherein the one or more additional paths correspond to having a highest confidence score that at least satisfies a minimum confidence threshold.

15. A machine-readable medium having stored thereon a set of instructions which, if performed by one or more processors, cause the one or more processors to at least:

identify a distribution of different geometric features of one or more paths within a plurality of images;

determine a relative frequency of the different geometric features based on the distribution;

calculate loss values based, at least in part, on one or more outputs generated by one or more neural networks using the plurality of images;

compute scaled loss values by scaling at least one of the loss values based, at least in part, on the relative frequency of the different geometric features; and update the one or more neural networks to predict one or more additional paths of one or more vehicles based, at least in part, on the scaled loss values.

16. The machine-readable medium of claim 15, wherein the different geometric features comprise at least one of distances between objects, pixel locations of path features represented in the plurality of images, or pixel locations of lens distortions represented in the plurality of images.

17. The machine-readable medium of claim 15, wherein the scaling of the loss values is further based, at least in, part on an inverse of a frequency of a geometric feature indicated by the distribution of the different geometric features.

18. The machine-readable medium of claim 15, wherein the distribution of the different geometric features is indicated by one or more histograms.

19. The machine-readable medium of claim 15, wherein the different geometric features include one or more curvatures.

20. The machine-readable medium of claim 15, wherein the one or more additional paths correspond to a highest confidence score that at least satisfies a minimum confidence threshold.

* * * * *